US 10,839,762 B2

(12) United States Patent
Miyanaga

(10) Patent No.: US 10,839,762 B2
(45) Date of Patent: Nov. 17, 2020

(54) DISPLAY DEVICE

(71) Applicant: Japan Display Inc., Minato-ku (JP)

(72) Inventor: Naoki Miyanaga, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 52 days.

(21) Appl. No.: 16/026,320

(22) Filed: Jul. 3, 2018

(65) Prior Publication Data

US 2019/0012974 A1 Jan. 10, 2019

(30) Foreign Application Priority Data

Jul. 10, 2017 (JP) .................. 2017-134431

(51) Int. Cl.
*G09G 3/36* (2006.01)
*G02F 1/133* (2006.01)
*G09G 3/20* (2006.01)

(52) U.S. Cl.
CPC ....... *G09G 3/3648* (2013.01); *G02F 1/13306* (2013.01); *G09G 3/20* (2013.01); *G09G 3/3677* (2013.01); *G02F 2201/123* (2013.01); *G02F 2201/56* (2013.01); *G09G 2310/0205* (2013.01); *G09G 2310/0267* (2013.01); *G09G 2310/0286* (2013.01); *G09G 2310/08* (2013.01)

(58) Field of Classification Search
CPC ...... G09G 3/20; G09G 3/3648; G09G 3/3677; G09G 2310/0205; G09G 2310/0267; G09G 2310/0286; G09G 2310/08; G02F 1/13306; G02F 2201/56; G02F 2201/123
USPC ....................................... 345/204
See application file for complete search history.

(56) References Cited

U.S. PATENT DOCUMENTS

| 8,305,324 | B2* | 11/2012 | Kim | G11C 19/184 345/100 |
| 9,064,466 | B2* | 6/2015 | Lin | G11C 19/28 |
| 2003/0227433 | A1* | 12/2003 | Moon | G09G 3/3677 345/100 |
| 2007/0085809 | A1* | 4/2007 | Wei | G09G 3/3677 345/100 |
| 2007/0216634 | A1* | 9/2007 | Kim | G09G 3/3677 345/100 |
| 2010/0141570 | A1* | 6/2010 | Horiuchi | G09G 3/3611 345/100 |

(Continued)

FOREIGN PATENT DOCUMENTS

| JP | 4970555 | 7/2012 |
| JP | 2016-224341 | 12/2016 |

*Primary Examiner* — Jason M Mandeville
(74) *Attorney, Agent, or Firm* — Oblon, McClelland, Maier & Neustadt, L.L.P.

(57) ABSTRACT

To improve surge tolerance of a shift register constituting a gate signal line driving circuit formed on a substrate of a flat panel display. A gate signal line driving circuit includes a shift register composed of a plurality of cascaded unit register circuits, and sequentially outputs gate signals to a plurality of gate signal lines. Of the unit register circuits, two register circuits positioned on the leading end side for the shift operation of the shift register receive a start signal in parallel to operate. The two register circuits respectively output signals to mutually different destinations such that an output signal from one of the two register circuits is inputted via a gate signal generation circuit to a gate signal line, while an output signal from the other register circuit is inputted into its downstream unit register circuit.

12 Claims, 11 Drawing Sheets

(56) References Cited

U.S. PATENT DOCUMENTS

| | | | |
|---|---|---|---|
| 2010/0238156 A1 | 9/2010 | Iwamoto et al. | |
| 2012/0139883 A1* | 6/2012 | Lee | G09G 3/3677 345/204 |
| 2014/0354523 A1* | 12/2014 | So | G09G 3/3677 345/100 |
| 2017/0052635 A1* | 2/2017 | Yu | G06F 3/044 |

* cited by examiner

DISPLAY DEVICE

CROSS-REFERENCE TO RELATED APPLICATION

The present application claims priority from Japanese application JP2017-134431 filed on Jul. 10, 2017, the content of which is hereby incorporated by reference into this application.

BACKGROUND OF THE INVENTION

1. Field of the Invention

The present invention relates to display devices and, in particular, to a gate signal line driving circuit that is disposed along an edge of a display area and drives a gate signal line.

2. Description of the Related Art

A display panel of an active matrix type has a display area, gate signal lines, and video signal lines. The display area has pixels two-dimensionally disposed therein in a matrix. The gate signal lines are disposed each for each pixel row. The video signal lines are disposed orthogonal to the gate signal lines and each for each pixel column. Circuits that respectively input signals to the gate signal lines and the video signal lines are disposed in an area (a frame area) outside the display area defined on the substrate of the display panel. Specifically, agate signal line driving circuit inputs a signal into a gate signal line to thereby select the relevant pixel row, and a video signal line driving circuit inputs a video signal into the selected pixel via a video signal line.

The gate signal line driving circuit has a shift register. The shift register includes cascaded unit register circuits at multiple stages. In response to a start pulse inputted into one end of the cascade of the unit register circuits, the unit shift registers sequentially output a pulse once, beginning with the one at one end of the cascade to the one at the other end of the cascade. This shift operation is executed interlocking with vertical scanning of a video.

The trend for display panels at a higher resolution leads to reduction in pitch for disposition of gate signal lines. This increases the demand for reduction of the dimension of the unit register circuits at multiple stages of the shift register.

SUMMARY OF THE INVENTION

A start pulse for a shift register of a gate signal line driving circuit is inputted into the gate electrode of a thin film transistor (TFT) connected to the input terminal of a unit register circuit. As only a small number of devices are connected to the start pulse wire and the dimension of the gate electrode of the TFT is small due to reduction in dimension of the unit register circuit, an electrostatic discharge (ESD) surge can occur in the start pulse wire, which likely destroys the TFT.

It is an object of the invention according to this application to provide a display device including a shift register having high surge tolerance, the shift register constituting a gate signal line driving circuit.

A display device according to the present invention includes a display area and a peripheral area around the display area, both defined on a substrate. In the display area, a plurality of pixels are disposed in a matrix, and a plurality of gate signal lines are disposed. The gate signal line supplies a gate signal to the pixels to enable writing of a video signal into the pixels. In the peripheral area, a gate signal line driving circuit and a control circuit are disposed. The gate signal line driving circuit includes a plurality of circuit units, each including a register circuit and a gate signal generation circuit that outputs the gate signal, based on an output signal from the register circuit. The control circuit outputs a control signal to the gate signal line driving circuit. As the circuit unit, a first circuit unit and a second circuit unit are available that both receive the control signal from the control circuit. In the first circuit unit having received the control signal, the register circuit supplies an output signal to another circuit unit, and the gate signal generation circuit refrains outputting of a gate signal. In the second circuit unit having received the control signal, the register circuit refrains outputting of a signal to another circuit unit, and the gate signal generation circuit outputs a gate signal to the gate signal line.

DETAILED DESCRIPTION OF THE INVENTION

The following describes an embodiment of the present invention (hereinafter referred to as an embodiment) based on the drawings.

The disclosure is related to mere examples, and any modification which a person skilled in the art can readily conceive without departing from the gist of the present invention is included in the range of the present invention. Although the drawings may illustrate the widths, thicknesses, shapes, and so forth of the respective units, more schematically as compared with those in actual aspect to make clearer the description, the drawings illustrate mere examples and should not limit the interpretation of the present invention. In this specification and the respective drawings, any element similar to that having been described earlier with respect to a drawing mentioned earlier is given the same reference mark and will not be described repetitively.

Figure 1:
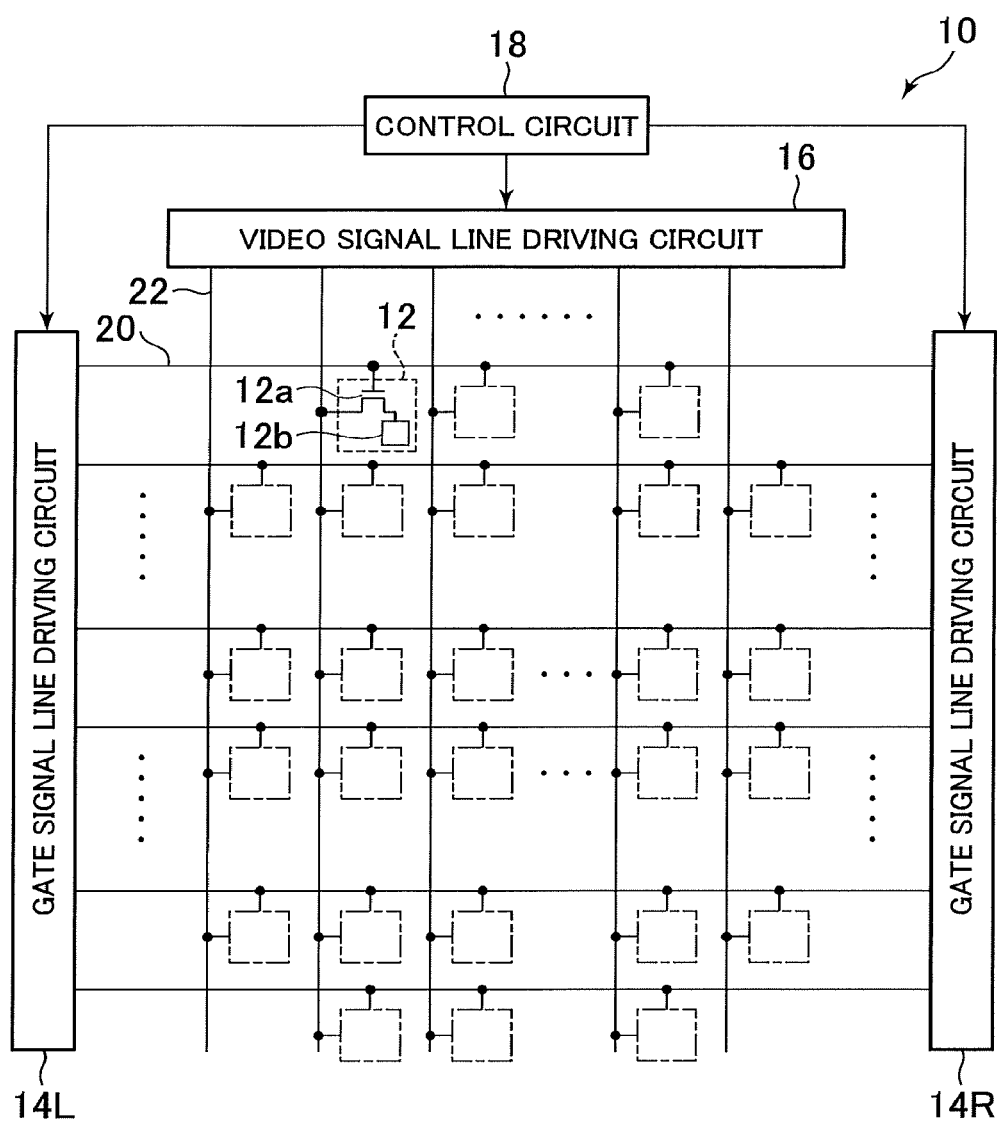
FIG. 1 is a schematic diagram of a structure of an image display device according to an embodiment of the present invention.

FIG. 1 is a schematic diagram of a structure of an image display device 10 according to an embodiment. The image display device 10 may be, for example, a display panel, such as a liquid crystal display. The image display device 10 includes a plurality of pixel circuits 12, a gate signal line driving circuit 14, a video signal line driving circuit 16, and a control circuit 18. These structural components of the display panel are formed basically using thin films that are laminated on a surface of a substrate made of glass or the like. For example, thin film transistors (TFT) are formed to constitute these circuits. The display panel can include an integrated circuit (IC) formed separately from the substrate and mounted on or connected to the substrate. For example, the control circuit 18 includes a driver IC.

The pixel circuits 12 are disposed in a matrix on a display portion (in a display area) so as to each correspond to each pixel. Note that "in a matrix" in this embodiment means that pixels are disposed in the mutually orthogonal row and column respective directions but does not mean that the whole area with pixels disposed therein is rectangular.

The gate signal line driving circuit 14 is connected to a plurality of gate signal lines 20, to each of which a plurality of pixel circuits 12 aligned in the horizontal direction (the row direction) are connected. The gate signal line driving circuit 14 sequentially outputs a gate signal to the gate signal lines 20 whereby the pixel circuits 12 connected to the respective gate signal lines 20 are made ready for data writing thereinto.

Meanwhile, the video signal line driving circuit 16 is connected to a plurality of video signal lines 22, to each of which a plurality of pixel circuits 12 aligned in the vertical direction (the column direction) are connected. The video signal line driving circuit 16 outputs a video signal at a voltage in accordance with the display data for one scan line to the video signal line 22. The video signal outputted to each video signal line 22 is written into the pixel circuit 12 that has been made ready for data writing thereinto by a gate signal. The pixel circuit 12 in turn controls the amount of light to be ejected from the pixel, based on the video signal written thereinto.

Assume that the image display device 10 is a liquid crystal display device, for example. In this case, for example, a pixel TFT 12a and a pixel electrode 12b are formed for the pixel circuit 12 on the surface of the substrate. The gate electrodes of the plurality of pixel TFTs 12a in each pixel row are connected to a common gate signal line 20 and receive a gate pulse inputted into the gate signal line 20 to be thereby turned into an ON state in units of a row. Meanwhile, the drains of the pixel TFTs 12a in each pixel column are connected to a common video signal line 22, so that a pixel electrode 12b connected to the source of the pixel TFT 12a having been turned into an ON state in response to a gate pulse receives a voltage in accordance with a video signal from the video signal line 22.

The control circuit 18 controls the operation of the gate signal line driving circuit 14 and the video signal line driving circuit 16.

The image display device 10 can include the gate signal line driving circuit 14 composed of a gate signal line driving circuit 14L disposed on the left side of the display portion and a gate signal line driving circuit 14R disposed on the right side of the display portion. In this embodiment, each gate signal line 20 is connected to the gate signal line driving circuit 14 on the left and right respective sides to be fed with the same gate signal on the both sides. For example, the gate signal line driving circuit 14R may supply a gate signal to the gate signal lines 20 in odd-numbered rows, while the gate signal line driving circuit 14L may supply a gate signal to the gate signal lines 20 in even-numbered rows.

In this embodiment, the gate signal line driving circuit 14 and the control circuit 18 constitute a shift register for one-directional shift operation. Specifically, the shift register sequentially supplies a gate signal to the gate signal lines 20, beginning with the one on the upper side of the display portion to the one on the lower side. Alternatively, the shift register may be a bi-directional shift register for bi-directional shift operation. In this case, the order for supplying a gate signal is switchable between the forward direction, or from the upper side to the lower side of the display portion, and the reverse direction, or from the lower side to the upper side.

Figure 2:
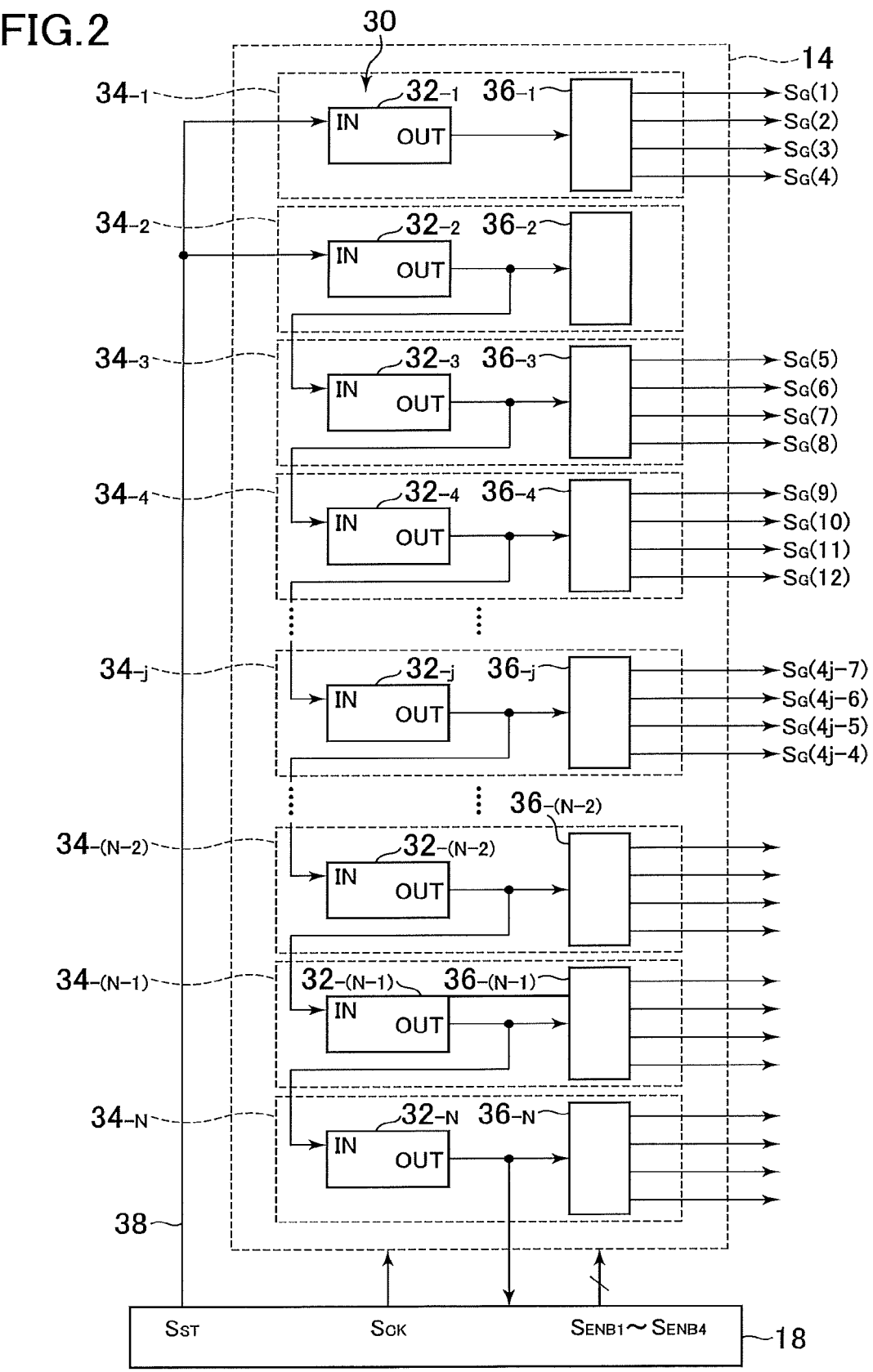
FIG. 2 is a block diagram of a schematic circuit structure of a gate signal line driving circuit according to an embodiment of the present invention.

FIG. 2 is a block diagram of a schematic circuit structure of the gate signal line driving circuit 14. The gate signal line driving circuit 14 is fed with power and a control signal from the control circuit 18 to operate. The shift register 30 in the gate signal line driving circuit 14 includes cascaded unit register circuits 32 at multiple stages. The gate signal line driving circuit 14 includes circuit units 34 at multiple stages each including one unit register circuit 32 and disposed on the substrate separately in respective discrete areas. In the shift register 30, basically, the unit register circuits at multiple stages sequentially output a pulse once, beginning with the one at one end of the cascade of the unit register circuits to the one at the other end of the cascade, while interlocking with vertical scanning or the like.

The gate signal line driving circuit 14 is disposed on the surface of the substrate in the frame area along one of the edges of the display area, the one edge being a connection edge along which the connection terminals to the gate signal lines 20 are aligned. Specifically, a plurality of gate signal lines 20 extending in the pixel row direction are aligned in the pixel column direction in the display area, with the connection terminals thereof being drawn out on the left and right respective sides of the display area. That is, the gate signal line driving circuit 14 is disposed along each of the left and right edges, or connection edges, of the display area, and the unit register circuits 32 and the circuit units 34 are aligned basically in the pixel column direction. Accordingly, in FIG. 2, a plurality of blocks representing the unit register circuits 32 and those representing the circuit units 34 are aligned vertically. With this alignment, the shift register 30 executes a shift operation from up to bottom of the cascade.

The gate signal line driving circuit 14 additionally includes a gate signal generation circuit 36 that generates a gate signal $S_G$, based on an output from the unit register circuit 32. The gate signal line driving circuit 14 supplies a gate pulse sequentially to the plurality of gate signal lines 20, beginning with the one on the upper side in the pixel column direction, while interlocking with a pulse transfer operation from the top to the bottom in the pixel column direction by the shift register 30. In this embodiment, the gate signal generation circuit 36 uses four-phase enable signals $S_{ENB1}$ to $S_{ENB4}$ to sequentially generate gate pulses to be supplied to four gate signal lines 20 successively aligned in the pixel column direction, while interlocking with the output pulse from the unit register circuit 32.

One of the characteristics of the gate signal line driving circuit 14 illustrated in FIG. 2 is that, among the plurality of the circuit units 34 connected in cascade, two circuit units 34 positioned at one end of the cascade respectively receive a control signal in parallel from the control circuit 18. That is, the two of the unit register circuits 32, referred to as end register circuits, positioned at the leading end side for the shift operation by the shift register 30 receive a start signal $S_{ST}$ in parallel from the control circuit 18 to operate. With the above, two gate electrodes of the TFTs at the respective inputs of the unit register circuits 32 are connected in parallel to the start signal line 38. This increases the capacity of the gate electrodes of the TFTs connected to the start signal line 38, which reduces a surge voltage of ESD, for example, occurring in the start signal line 38. Accordingly, an adverse effect on the gate signal line driving circuit 14 is reduced.

Specifically, the first and second unit register circuits 32-1, 32-2, counted from the top, receive a start pulse at the input terminals IN thereof from the start signal line 38 to operate as the end register circuits.

In the gate signal line driving circuit 14, basically, an output pulse from the unit register circuit 32 is assigned with two functions, including one of generating a gate signal (a gate signal generating function) and one of being inputted into a downstream unit register circuit 32 to trigger the operation of the unit register circuit 32 (a downstream stage trigger function). The unit register circuits 32-1, 32-2 are assigned with these functions such that one unit register circuit is assigned with one of these functions and the other with the other of the functions. Specifically, an output pulse from the unit register circuit 32-1 is used only for the gate signal generating function, while an output pulse from the unit register circuit 32-2 is used only for the downstream stage trigger function. That is, the end register circuits are different from the other unit register circuits 32 in structure in terms of connection relation between the unit register circuits 32 in the shift register 30.

Specifically, in FIG. 2, the unit register circuit 32-1 receives a start pulse and then outputs a pulse. Thereafter, while interlocking with the output, the gate signal generation circuit 36-1 sequentially generates and outputs gate pulses as signals $S_G(1)$ to $S_G(4)$ directed to the first to fourth respective gate signal lines 20, counted from the top. The pulse outputted from the unit register circuit 32-1 is not inputted into other unit register circuits 32. That is, the unit register circuit 32-1 does not trigger the operation of other unit register circuits 32.

Meanwhile, the output terminal OUT of the unit register circuit 32-2 is connected to the input terminal IN of a third unit register circuit 32-3, counted from the top, and, when the unit register circuit 32-2, having received a start pulse, outputs a pulse, the pulse is transferred to the unit register circuit 32-3 to trigger the operation of the unit register circuit 32-3. The gate signal generation circuit 36-2, which constitutes a single circuit unit on the substrate together with the unit register circuit 32, is not connected to the gate signal line 20. That is, the gate signal generation circuit 36-2 substantially does not implement a gate signal generating function despite receipt of a pulse from the unit register circuit 32-2. In this regard, the circuit unit 34-2 may not include the gate signal generation circuit 36-2.

Assuming that the number of the unit register circuits 32 constituting the shift register 30 is N, the third to $N^{th}$ unit register circuits 32-3 to 32-N, counted from the top, correspond to the unit register circuits 32 other than the end register circuits. An output from the unit register circuit 32-N at the last stage is not used for the downstream stage trigger function but used only for the gate signal generating function. Outputs from the other unit register circuits 32-3 to 32-(N-1) are used for both the downstream stage trigger function and the gate signal generating function. Specifically, a $j^{th}$ (3<=j<=N) unit register circuit 32-j receives a pulse at its input terminal IN from its upstream unit register circuit 32 and in turn outputs a pulse in response to the pulse received. The pulse is inputted into the gate signal generation circuit 36-j, which then sequentially outputs gate pulses as signals $S_G(4j-7)$ to $S_G(4j-4)$ directed to $(4j-7)^{th}$ to $(4j-4)^{th}$ respective gate signal lines 20. The output pulse from the unit register circuit 32-j is inputted into the input terminal IN of its downstream unit register circuit 32-(j+1) except in the case of j=N. Note that an output pulse from the unit register circuit 32-N can be inputted into the control circuit 18, for example, to be used in control or the like in ending the shift operation.

With the presence or absence of the gate signal generating function focused, the circuit unit 34 including the unit register circuit 32 other than the end register circuits is common in structure to the circuit unit 34-1 including the unit register circuit 32-1, or one of the end register circuits, the one assigned with the gate signal generating function. On the other hand, the circuit unit 34-2 including the unit register circuit 32-2, or the other of the end register circuits, the other assigned with the downstream stage trigger function, is different from the other circuit units 34, in the case where the circuit unit 34-2 does not include the gate signal generation circuit 36-2, which is omissible from the unit circuit 34-2.

Figure 3:
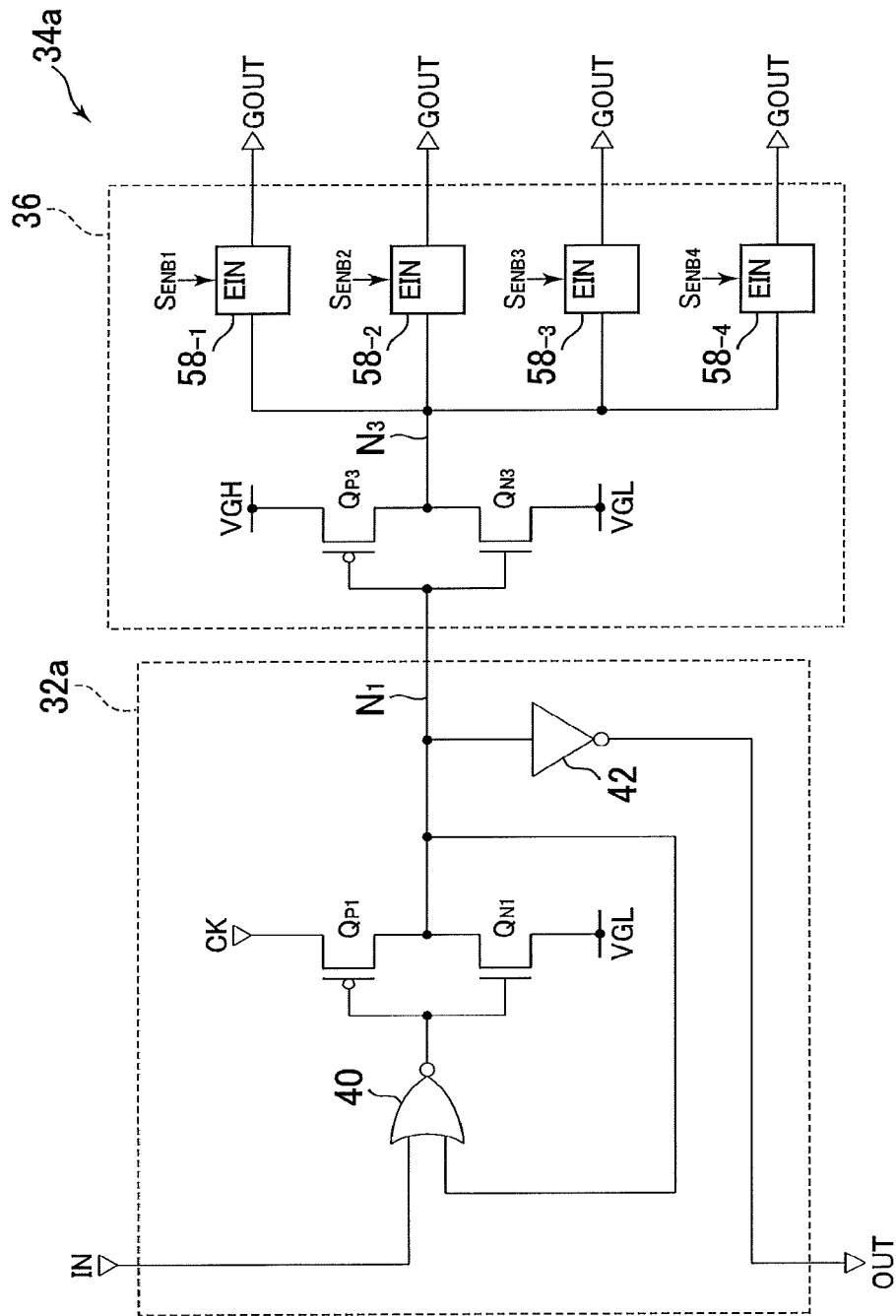
FIG. 3 illustrates a schematic circuit structure of one example of a circuit unit constituting a gate signal line driving circuit.
Figure 4:
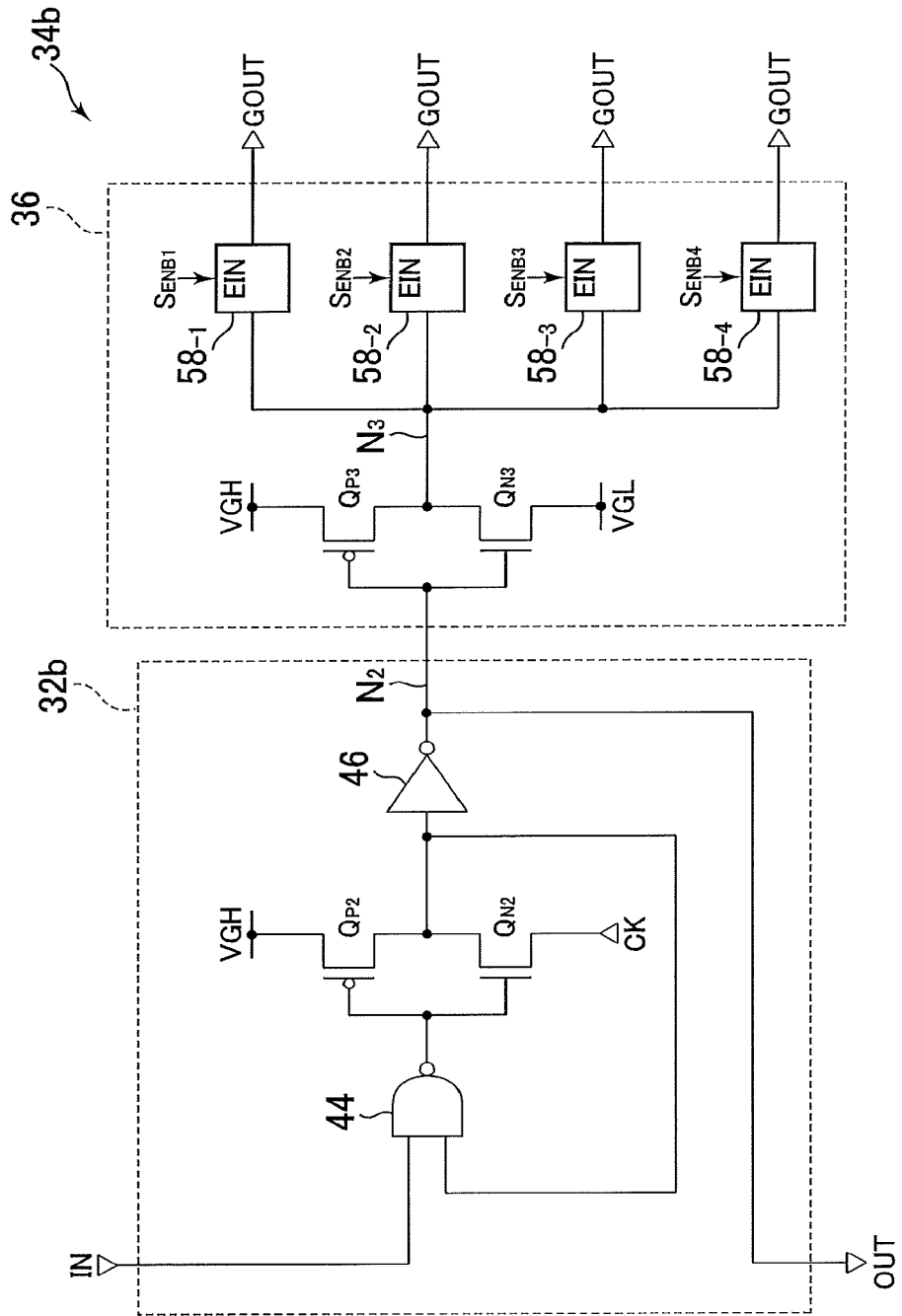
FIG. 4 illustrates a schematic circuit structure of one example of a circuit unit constituting a gate signal line driving circuit.
Figure 5:
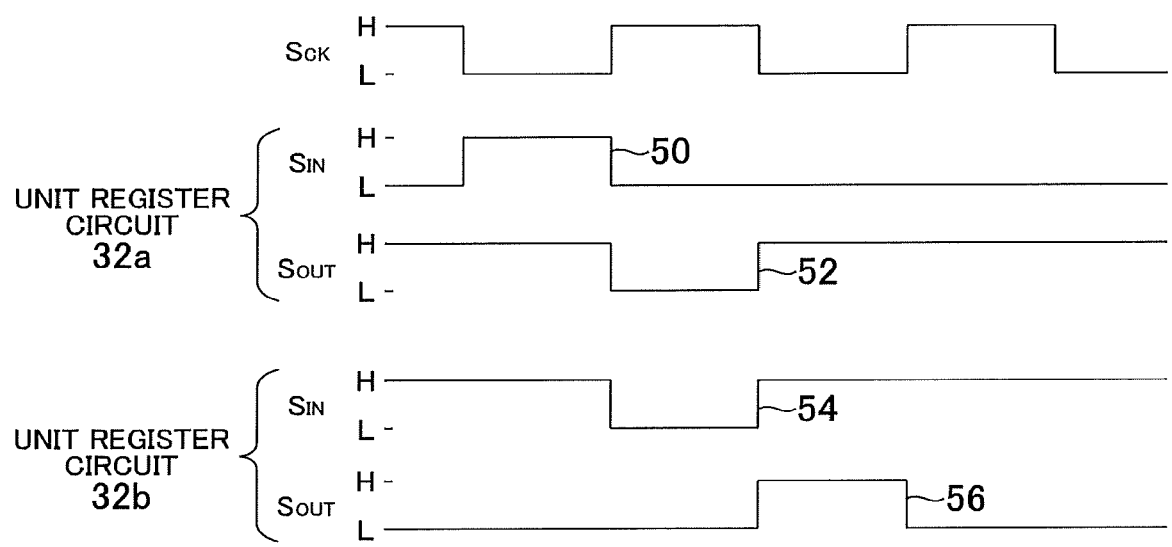
FIG. 5 is a schematic timing diagram for the operation of the unit register circuits illustrated in FIGS. 3 and 4.

FIG. 3 and FIG. 4 illustrate schematic circuit structures of one example of the circuit unit 34. The circuit unit 34a in FIG. 3 differs from the circuit unit 34b in FIG. 4 in the structure of the unit register circuit 32. FIG. 5 is a schematic timing diagram for the operation of the unit register circuit 32 illustrated in FIGS. 3 and 4.

The unit register circuit 32a illustrated in FIG. 3 includes an NOR gate 40, an inverter 42, a transistor $Q_{P1}$ that is a p-channel TFT (p-TFT), and a transistor $Q_{N1}$ that is an n-channel TFT (n-TFT). The gates of the transistors $Q_{P1}$ and $Q_{N1}$ are both connected to the output terminal of the NOR gate 40, and the drains thereof to the node $N_1$, so that either one of the transistors $Q_{P1}$ and $Q_{N1}$ is selectively turned on, based on the gate potential. The source of the transistor $Q_{P1}$ is connected to the clock input terminal CK, while the source of the transistor $Q_{N1}$ is connected to the power source VGL at a predetermined low potential (L level). The NOR gate 40 receives an input signal directed to the input terminal IN of the unit register circuit 32a and the potential at the node $N_1$. The inverter 42 inverts the potential level at the node $N_1$ to output the result to the output terminal OUT of the unit register circuit 32a.

Meanwhile, the unit register circuit 32b illustrated in FIG. 4 includes an NAND gate 44, an inverter 46, a transistor $Q_{P2}$ that is a p-TFT, and a transistor $Q_{N2}$ that is an n-TFT. The gates of the transistors $Q_{P2}$ and $Q_{N2}$ are both connected to the output terminal of the NAND gate 44, and the drains thereof to the node $N_2$, so that either one of the transistors $Q_{P2}$ and $Q_{N2}$ is selectively turned on, based on the gate potential. The source of the transistor $Q_{N2}$ is connected to a clock input terminal CK, while the source of the transistor $Q_{P2}$ is connected to a power source VGH at a predetermined high potential (H level). The NAND gate 44 receives an input signal directed to the input terminal IN of the unit register circuit 32b and the potential at the drains of the transistors $Q_{P2}$ and $Q_{N2}$. The inverter 46 inverts the potential level at the drains of the transistors $Q_{P2}$ and $Q_{N2}$ and outputs the result to the output terminal OUT of the unit register circuit 32b.

As illustrated in FIG. 5, the unit register circuit 32a illustrated in FIG. 3 receives a pulse 50, or a pulse (a positive pulse) that rises from an L level to an H level, as an input signal $S_{IN}$ at the input terminal IN, and in turn outputs a pulse 52 (a negative pulse) that falls from an H level to an L level as an output signal $S_{OUT}$ via the output terminal OUT. Meanwhile, the unit register circuit 32b illustrated in FIG. 4 receives a negative pulse 54 as an input signal $S_{IN}$ at the input terminal IN, and in turn outputs a positive pulse 56 as an output signal $S_{OUT}$ via the output terminal OUT. Thus, in the cascade connection of the shift register 30, the unit register circuit 32a in FIG. 3 and the unit register circuit 32b in FIG. 4 are alternately connected. For example, assuming that the unit register circuit 32-2 in FIG. 2 has a structure same as that of the unit register circuit 32a, odd-numbered unit register circuits among $j^{th}$ unit register circuits 32-j ($3<=j<=N$) have a structure same as that of the unit register circuit 32b, while even-numbered unit register circuits have a structure same as that of the unit register circuit 32a.

Regarding the unit register circuit 32a, for example, the unit register circuit 32-2 receives the pulse of the start signal $S_{ST}$ as the positive pulse 50 of the input signal $S_{IN}$ at its input terminal IN, upon which the transistor $Q_{P1}$ is turned into an ON state. The start pulse of the start signal $S_{ST}$ is timed to remain at an H level until the clock signal $S_{CK}$ is turned into an H level. With the above, the clock signal $S_{CK}$ is switched into an H level during the period with the transistor $Q_{P1}$ in an ON state. The transistor $Q_{P1}$ remains in an ON state while the clock signal $S_{CK}$ remains at an H level. As a result, a positive pulse corresponding to the period with the clock signal $S_{CK}$ at an H level is obtained at the node $N_1$. A negative pulse 52 obtained by inverting that pulse is outputted via the output terminal OUT.

Note that due to a signal delay in the unit register circuit 32a, the period with the negative pulse 52 at an L level does not perfectly coincide with the period with the clock signal $S_{CK}$ at an H level but drags into the subsequent period with the clock signal $S_{CK}$ at an L level. Also in the operation of the unit register circuit 32b in FIG. 4, to be described later, the period with the positive pulse 56 outputted at an H level does not perfectly coincide with the period with the clock signal $S_{CK}$ at an L level but drags into the subsequent period with the clock signal $S_{CK}$ at an H level for the same reason.

Regarding the $j^{th}$ unit register circuit 32 (j=3 to N) mentioned above, an even-numbered unit register circuit 32a, which receives the positive pulse 56 from an odd-numbered unit register circuit 32b as the positive pulse 50, operates similar to the above-mentioned unit register signal 32-2 as the period with the positive pulse 50 has an overlap with the period with the clock signal $S_{CK}$ at an H level.

Note that the unit register circuit 32-1, which receives the pulse of the start signal $S_{ST}$ at the input terminal IN to operate, similar to the unit register circuit 32-2, has a structure same as that of the unit register circuit 32a illustrated in FIG. 3.

Meanwhile, the unit register circuit 32b receives a negative pulse 52 from its upstream unit register circuit 32a as the negative pulse 54 at its input terminal IN, upon which the transistor $Q_{N2}$ is turned into an ON state. As described above, as the period with the negative pulse 52 at an L level has an overlap with a period with the clock signal $S_{CK}$ at an L level, the clock signal $S_{CK}$ is switched into an L level during the period with the transistor $Q_{N2}$ in an ON state. The transistor $Q_{N2}$ remains in an ON state while the clock signal $S_{CK}$ remains at an L level. As a result, a positive pulse corresponding to the period with the clock signal $S_{CK}$ at an L level is obtained at the nord $N_2$, or the output terminal of the inverter 46. A positive pulse 56 is outputted from the output terminal OUT.

In operations of the unit register circuits 32a, 32b, basically, the same signals appear at the nodes $N_1$, $N_2$. This allows to employ the same circuit structure for the gate signal generation circuits 36, which are connected to the respective nodes $N_1$, $N_2$, in the circuit units 34.

For example, the gate signal generation circuit 36 includes an inverter circuit including the transistor $Q_{P3}$ that is a p-TFT and the transistor $Q_{N3}$ that is an n-TFT, and inverts the potential level at the node $N_1$, $N_2$ to output the result to the node $N_3$. The inverter circuit functions as a buffer circuit to enable simultaneous driving of four ENB circuits 58-1 to 58-4 connected in parallel to the node $N_3$.

Figure 6:
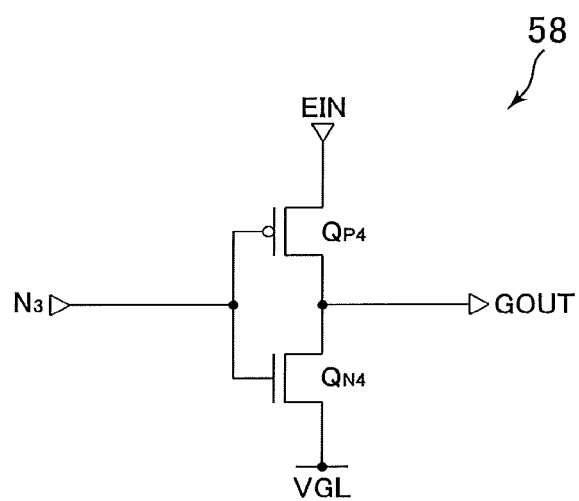
FIG. 6 is a schematic circuit diagram of an example of a circuit structure of an ENB circuit.
Figure 7:
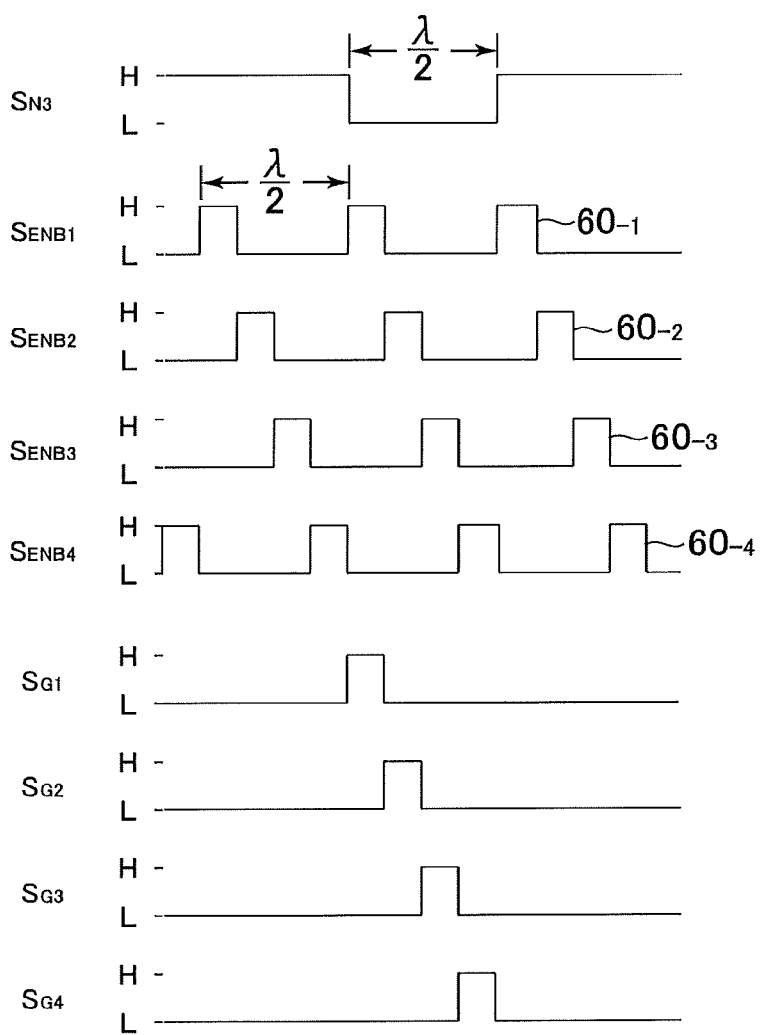
FIG. 7 is a schematic timing diagram for the operation of an ENB circuit.

FIG. 6 is a schematic circuit diagram of an example of a circuit structure of an ENB circuit 58 as a representative of the four ENB circuits 58 provided in each gate signal generation circuit 36. FIG. 7 is a schematic timing diagram for the operation of the ENB circuit 58.

The ENB circuit 58 includes a transistor $Q_{P4}$ that is a p-TFT and a transistor $Q_{N4}$ that is an n-TFT. The gates of the transistors $Q_{P4}$, $Q_{N4}$ are both connected to the node $N_3$ and the drains thereof to the gate signal output terminal GOUT, so that either one of the transistors $Q_{P4}$, $Q_{N4}$ is selectively turned on, based on the gate potential. The source of the transistor $Q_{Q4}$ is connected to the enable signal input terminal EIN, while that of the transistor $Q_{N4}$ is connected to the power source VGL. The controller circuit 18 supplies four-phase clock signals that generate positive pulses 60 (60-1 to 60-4) at mutually different timing as enable signals $S_{ENB1}$ to $S_{ENB4}$ to each gate signal generation circuit 36, and an enable signal $S_{ENBk}$ is inputted to the terminal EIN of the ENB circuit 58-k (k=1 to 4). The cycle of each of the enable signals $S_{ENB1}$ to $S_{EMB4}$ is set to a half of the cycle A of the clock signal $S_{CK}$. In each gate signal generation circuit 36, the pulses of the respective enable signals $S_{ENB1}$ to $S_{ENB4}$ are inputted once during a period having a length $\lambda/2$ during which a potential signal $S_{N3}$ that appears at the node $N_3$ in response to a pulse output from the unit register circuit 32 is turned into an L level and the transistors $Q_{P4}$ of the four ENB circuits 58 are simultaneously turned on. With the above, a positive pulse corresponding to the pulse 60-k of the enable signal $S_{ENBk}$ is outputted as a signal $S_{GK}$, which is outputted from the output terminal GOUT of the ENB circuit 58-k to the gate signal line 20.

Figure 8:
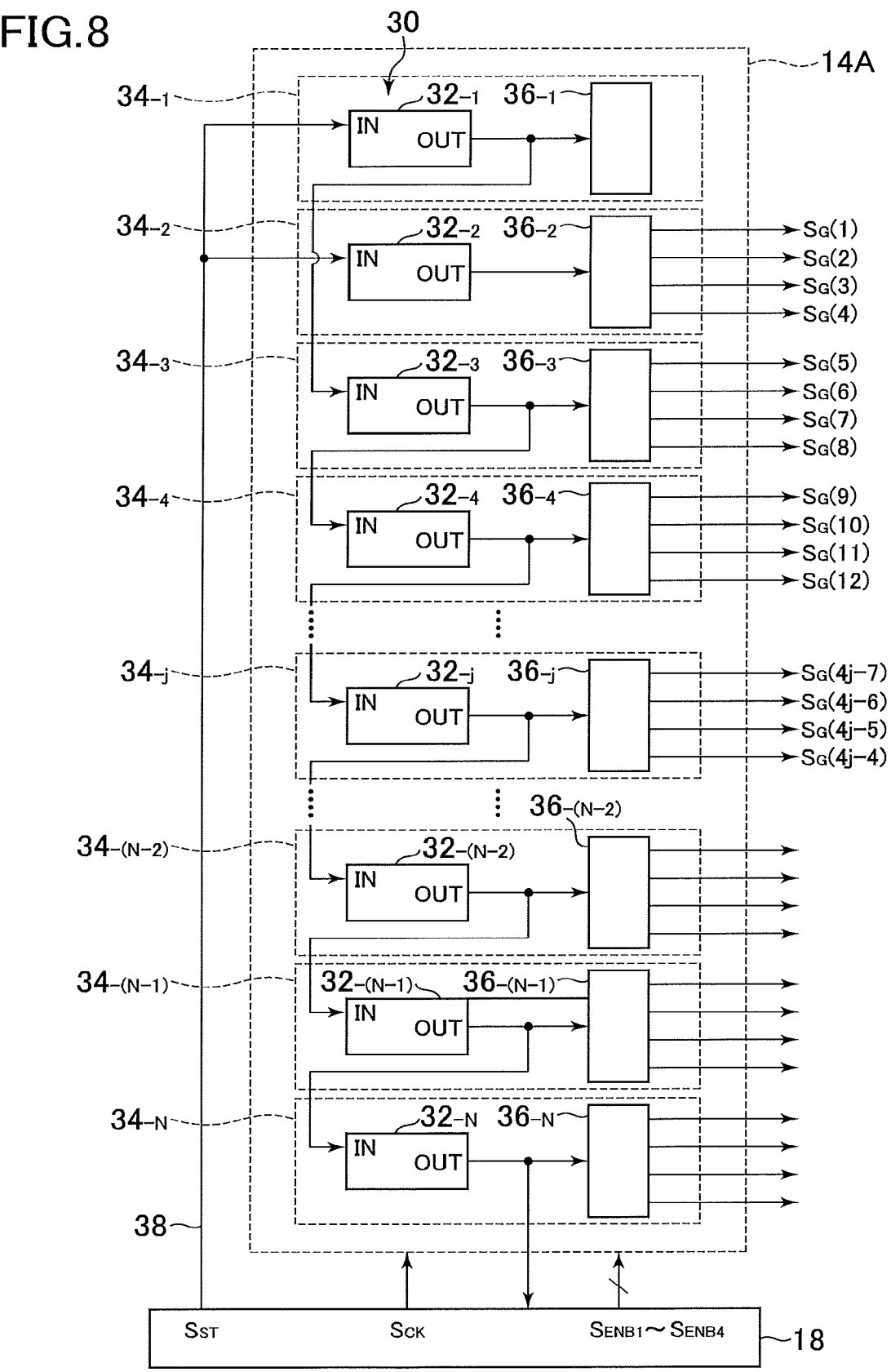
FIG. 8 is a block diagram of an example of another structure of a gate signal line driving circuit according to an embodiment of the present invention.

FIG. 8 is a block diagram of an example of another structure of the gate signal line driving circuit according to an embodiment of the present invention. In a gate signal line driving circuit 14A illustrated in FIG. 8, the respective end register circuits, namely, the unit register circuits 32-1, 32-2, are assigned with respective opposite functions from those in the gate signal line driving circuit 14 illustrated in FIG. 2. That is, in the gate signal line driving circuit 14A, an output pulse from the unit register circuit 32-1 is used only for the downstream stage trigger function, and an output pulse from the unit register circuit 32-2 is used only for the gate signal generating function.

Figure 9:
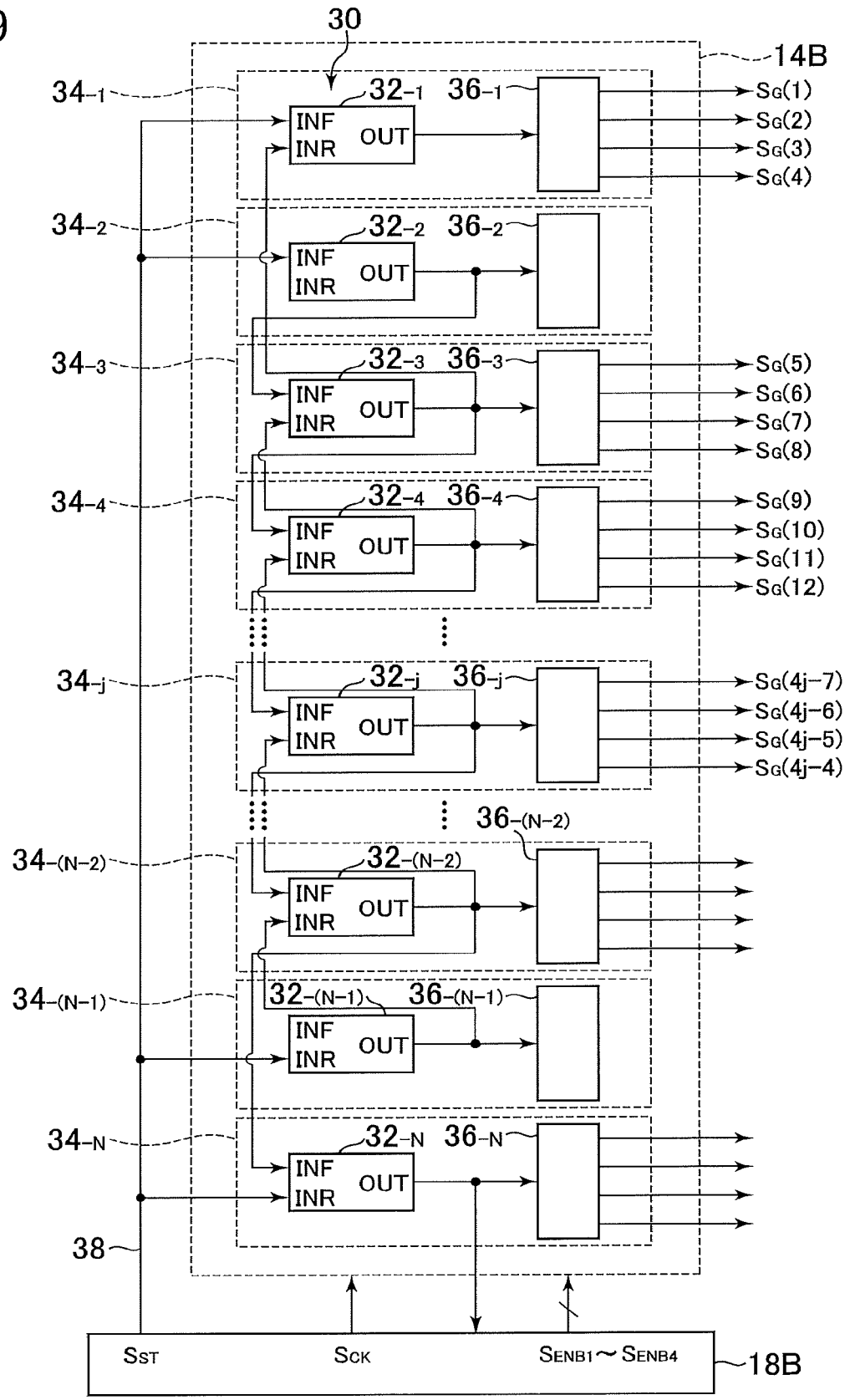
FIG. 9 is a block diagram of an example of still another structure of a gate signal line driving circuit according to an embodiment of the present invention.

FIG. 9 is a block diagram of an example of a still another structure of the gate signal line driving circuit according to an embodiment of the present invention. A gate signal line driving circuit 14B and a control circuit 18B illustrated in FIG. 9 are different in structure from the gate signal line driving circuit 14 and the control circuit 18 illustrated in FIG. 2 in that the former constitute a bidirectional shift register. Accordingly, besides the above-mentioned two circuit units 34 positioned at one end of the cascade of the plurality of circuit units 34, two circuit units 34-N, 34-(N-1) positioned at the other end of the cascade as well can receive a control signal in parallel from the control circuit 18. That is, the shift register 30 of the gate signal line driving circuit 14B has two end register circuits described with reference to the gate signal line driving circuit 14 illustrated in FIG. 2 at each of the both ends of the cascade connection. Accordingly, not only the unit register circuits 32-1, 32-2 positioned at the leading end side for a shift operation in the forward direction but also the unit register circuits 32-N, 32-(N-1) positioned at the leading end side for a shift operation in the reverse direction are end register circuits.

Specifically, the input terminals of the unit register circuit 32-N, 32-(N-1) are connected to the start signal line 38, so that the unit register circuits 32-N, 32-(N-1) receive a start signal $S_{ST}$ from the control circuit 18B in parallel to operate in a shift operation in the reverse direction. With the above, in a shift operation in the reverse direction as well, similar to the above-mentioned shift operation in the forward direction, a surge voltage of ESD, for example, occurring in the start signal line 38 is reduced, and an adverse effect on the gate signal line driving circuit 14B is thus reduced.

Similar to the above-described unit register circuits 32-1, 32-2, the unit register circuits 32-N, 32-(N-1), functioning as the end register circuits, are assigned mutually differently with the gate signal generating function and the downstream stage trigger function. Specifically, an output pulse from the unit register circuit 32-N is used only for the gate signal generating function, while an output pulse from the unit register circuit 32-(N-1) is used only for the downstream stage trigger function. The respective functions assigned to the unit register circuits 32-N, 32-(N-1) can be opposite from those mentioned above, similar to the structure illustrated in FIG. 8 relative to the structure illustrated in FIG. 2.

To enable switching between the forward direction and the reverse direction for the shift operation, a circuit is provided to switch the circuit units to which the control circuit 18 inputs a control signal between the pair of the circuit units 34-1 and 34-2 and the pair of the circuit units 34-(N-1) and 34-N. For example, the unit register circuit 32 illustrated in FIG. 9 can include an input terminal INF for a shift operation in the forward direction, an input terminal INR for a shift operation in the reverse direction, and a switch that switches a signal for use in the operation of the unit register circuit 32 between a signal inputted into the input terminal INF and a signal inputted into the input terminal INR, based on the control signal from the control unit 18B. Specifically, the unit register circuit 32 in FIG. 9 can have a structure in which the input terminals INF, INR of the unit register circuit 32 are connected to the NOR gate 40 or the NAND gate 44 via a changeover switch, instead of a structure in which the input terminal IN of the unit register circuit 32 illustrated in FIGS. 3 and 4 is directly connected to the NOR gate 40 or the NAND gate 44.

The start signal line 38 is connected to the input terminals INF of the unit register circuits 32-1, 32-2, and to the input terminals INR of the unit register circuits 32-N, 32-(N-1). The output terminal OUT of a $j^{th}$ ($4 <= j <= N-3$) unit register circuit 32 is connected to the input terminal INF of a $(j+1)^{th}$ unit register circuit 32 and the input terminal INR of a $(j-1)^{th}$ unit register circuit 32.

As to the cascade connection between the upper end register circuits and the other unit register circuits, the unit register circuit 32-3 adjacent to the end register circuits receives an output pulse from one of the end register circuits to operate, the one assigned with the downstream stage trigger function, in a shift operation in the forward direction, and outputs a pulse into one of the end register circuits, the one assigned with the gate signal generating function, in a shift operation in the reverse direction. Specifically, in the structure illustrated in FIG. 9, in which, of the upper end register circuits, the unit register circuit 32-1 is assigned with the gate signal generating function, and the unit register circuit 32-2 is assigned with the downstream stage trigger function, the output terminal OUT of the unit register circuit 32-2 is connected to the input terminal INF of the third unit register circuit 32-3, and the output terminal OUT of the third unit register circuit 32-3 is connected to the input terminal INR of the unit register circuit 32-1, not the unit register circuit 32-2.

The above description on the upper end register circuits is similarly applied to the cascade connection between the lower end register circuits and the other unit register circuits. That is, the unit register circuit 32-(N-2) adjacent to the end register circuits receives at its input terminal INR an output pulse from one of the end register circuits to operate, the one assigned with the downstream stage trigger function, namely, the unit register circuit 32-(N-1) in the structure illustrated in FIG. 9, in a shift operation in the reverse direction, and outputs a pulse to the input terminal INF of one of the end register circuits, the one assigned with the signal generating function, namely, the unit register circuit 32-N in the structure illustrated in FIG. 9, in a shift operation in the forward direction.

Figure 10:
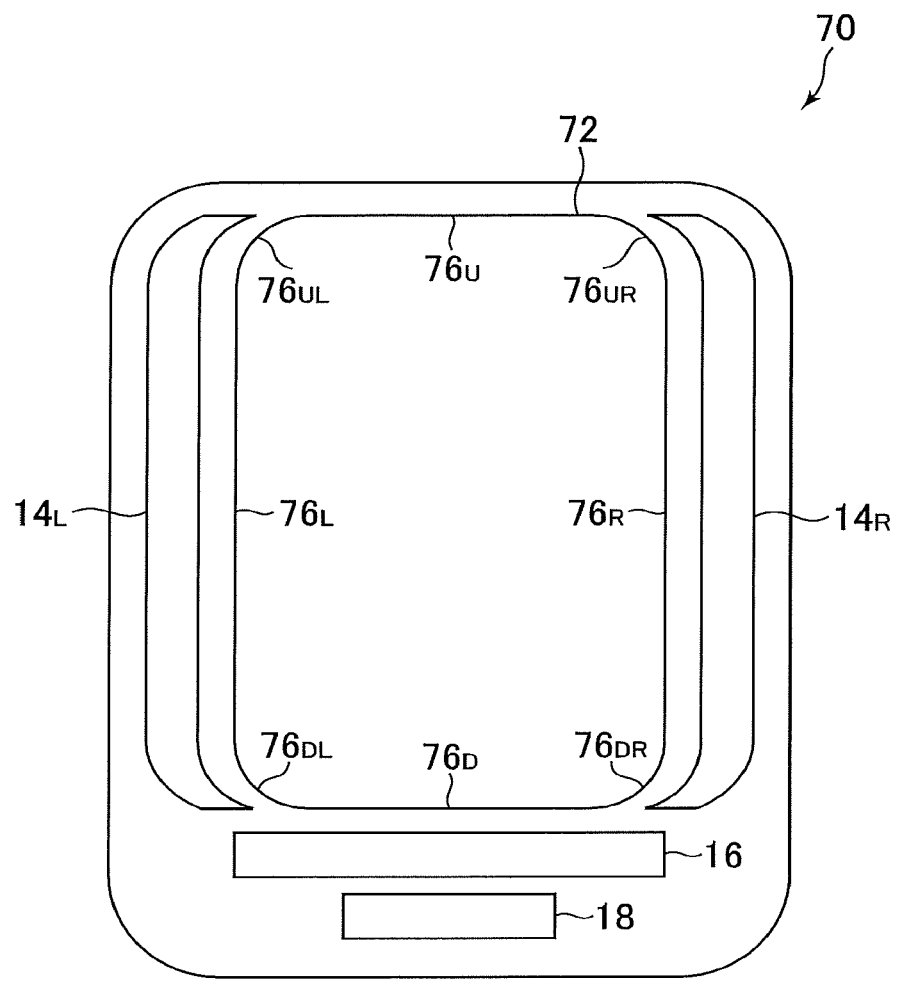
FIG. 10 is a schematic plan view of a substrate where a pixel circuit, a gate signal line driving circuit, or the like of an image display device are to be disposed.

FIG. 10 is a schematic plan view of a substrate 70 where, for example, the pixel circuit 12 and the gate signal line driving circuit 14 of the image display device 10 are to be disposed. In the display area 72, the pixel circuit 12, the gate signal line 20, and the video signal line 22 illustrated in FIG. 1 are to be disposed. The display area 72 can be shaped other than rectangular, or non-rectangular, here. For example, in FIG. 10, the overall edge 76 of the display area 72 includes horizontally extending linear portions $76_U$, $76_D$ on the upper and lower respective sides of the display area 72 and vertically extending linear portions $76_L$, $76_R$ on the left and right respective sides of the display area 72, in which the linear portions are connected via respective arc portions $76_{UL}$, $76_{DL}$, $76_{UR}$, $76_{DR}$. That is, in the example illustrated in FIG. 10, the display area 72 basically has a rectangular shape with rounded corners. Note that expressions such as "arc", "linear", or the like here describe only substantial shapes but not necessarily strict shapes. That is, the edge of the display area 72 can have bumps and dents in the scale in accordance with the pixels, and thus often does not define a smooth arc or linear shape. Such minute shapes, however, are disregarded here.

For example, the substrate 70 can be shaped similar to the non-rectangular display area 72 to achieve a narrower frame of the substrate 70 and eventually a smaller display panel of the image display device 10. To achieve such a narrower frame, components, such as the gate signal line driving circuit 14, the video signal line driving circuit 16, and wires, to be disposed on the substrate 70 in a peripheral area around the display area 72, that is, an area positioned more outward than the display area 72, can be laid out along the edge of the display area 72. For example, as described above, the gate signal line driving circuit 14 is disposed on the substrate 70 so as to be opposed to the connection edge of the display area 72, along which the connection terminals to the gate signal lines 20 are aligned. In the case where the connection edge has a curved portion (a non-rectangular portion) in a plan view, the circuit units 34 at multiple stages constituting the gate signal line driving circuit 14 are disposed along the partially curved line in accordance with the connection edge, whereby a narrower frame can be achieved.

Specifically, in the example illustrated in FIG. 10, the connection edge for the gate signal line driving circuit 14 includes the left edge of the display area 72 (the arc portion 76$_{UL}$, the linear portion 76$_L$, and the arc portion 76$_{DL}$) and the right edge of the display area 72 (the arc portion 76$_{UR}$, the linear portion 76$_R$, and the arc portion 76$_{DR}$), and the gate signal line driving circuits 14L, 14R are laid out while curving along the connection edges.

Figure 11:
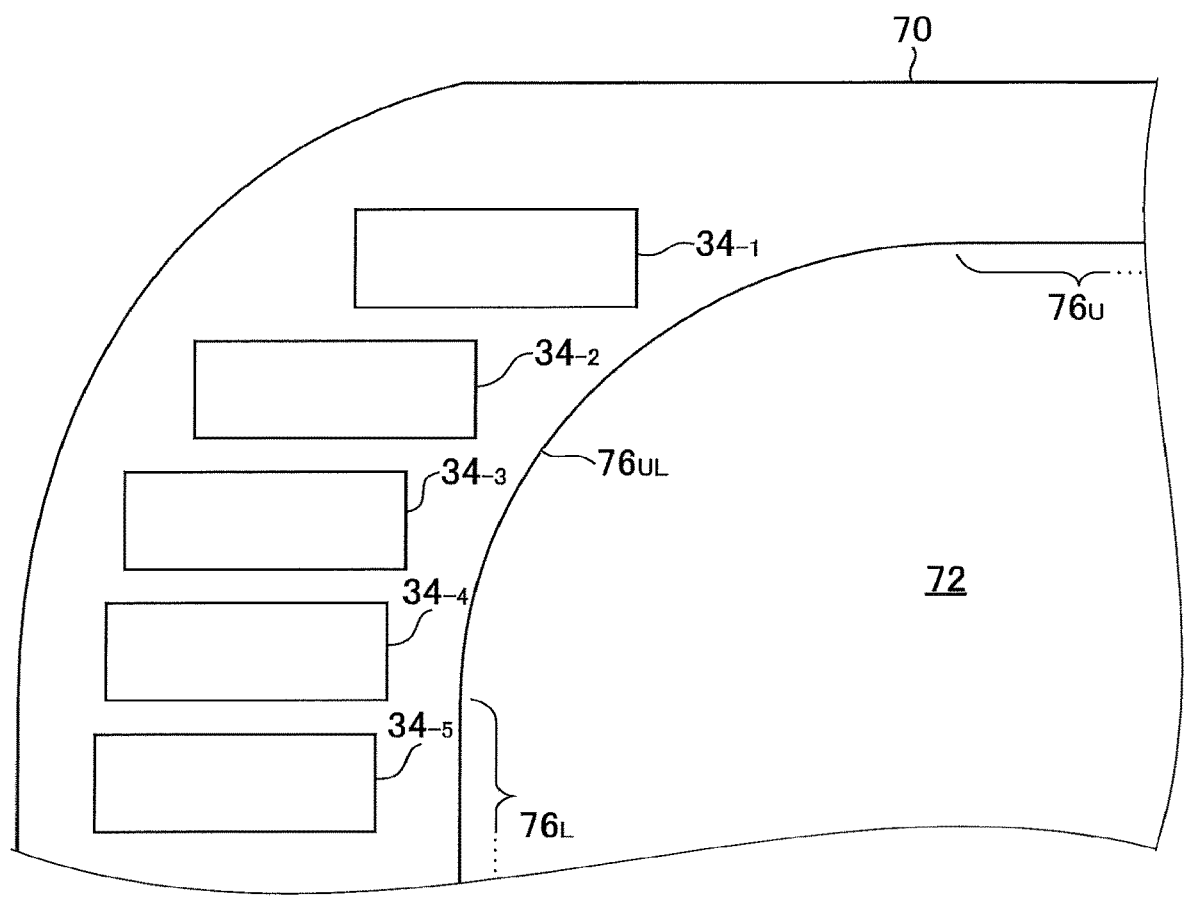
FIG. 11 is an enlarged schematic diagram of an upper left portion of the substrate illustrated in FIG. 10.

FIG. 11 is an enlarged schematic diagram of an upper left portion of the substrate 70 illustrated in FIG. 10. The circuit units 34, which are vertically aligned as described referring to FIG. 2, are disposed such that their coordinates not only in the vertical direction but also in the horizontal direction are sequentially displaced in an area near the curved portion (the arc portion 76$_{UL}$ in FIG. 11) of the connection edge. For example, in FIG. 11, the four upper circuit units 34-1 to 34-4 of the gate signal line driving circuit 14 are disposed along the arc portion 76$_{UL}$ such that upper circuit units are positioned more rightward. This arrangement can reduce the space between the circuit unit 34 and the display area 72, whereby a narrower frame is achieved. In the lower left, upper right, and lower right portions of the substrate 70 as well, the circuit units 34 are disposed along the curved edges of the display area 72.

In this embodiment, the unit register circuits 32 included in the two upper circuit units 34 in the gate signal line driving circuit 14, namely, the circuit units 34-1, 34-2, are end register circuits. In the case where an upper portion of the upper connection edge is curved, as in the example in FIG. 10, the circuit units 34 including the end register circuits are aligned along the curved portion. The circuit units 34 aligned along the curved portion can include not only one including an end register circuit but also one including a unit register circuit 32 other than an end register circuit.

In the gate signal line driving circuit 14B illustrated in FIG. 9 having a bidirectional shift register, the two upper circuit units 34 and the two lower circuit units 34 include end register circuits. In the case where both the upper and lower portions of the connection edge are curved, as in the example in FIG. 10, the circuit units 34-1, 34-2 including the end register circuits are aligned along the upper curved portion, while the circuit units 34-N, 34-(N-1) including the end register circuits are aligned along the lower curved portion.

The present invention is not limited to the above-described embodiments but is adapted to various modifications. For example, the structure described in the embodiment can be replaced by a substantially identical structure, a structure producing an identical effect, or a structure achieving the same object.

Although an example in which the image display device according to the above embodiment is a liquid crystal display panel has been described, the present invention is applicable to other types of display devices. For example, the image display device may be an organic electroluminescence (EL) display device.

Although a rectangular shape with rounded corners has been described as an example of a non-rectangular display in the above embodiment, the non-rectangular display area may have a different shape. That is, even an image display device having a display area in a non-rectangular shape other than the above-mentioned shape can have a gate signal line driving circuit disposed along the partially curved connection edge of the display area, in which the gate signal line driving circuit includes circuit units at multiple stages that are different in structure between one including an end register circuit and one including a unit register circuit that is not an end register circuit.

What is claimed is:

1. A display device, comprising:
   a display area and a peripheral area around the display area, both defined on a substrate;
   a plurality of pixels disposed in a matrix in the display area;
   a plurality of gate signal lines disposed in the display area, for supplying a gate signal that enables writing of a video signal into the pixel;
   a gate signal line driving circuit including a plurality of circuit units connected in cascade and disposed in the peripheral area, each of the circuit units including a register circuit and a gate signal generation circuit, each gate signal generation circuit outputting at least one gate signal to at least one of the plurality of gate signal lines based on an output signal from a corresponding register circuit, each register circuit including a first input terminal connected to an output terminal of a register circuit of another circuit unit; and
   a control circuit disposed in the peripheral area, for outputting a control signal to the gate signal line driving circuit, wherein
   the gate signal line driving circuit further includes a first circuit unit and a second circuit unit of the plurality of circuit units, both receiving the control signal from the control circuit,
   the first input terminal of the register circuit of the first circuit unit and the first input terminal of the register circuit of the second circuit unit are connected in parallel to a start signal line instead of an output terminal of a register circuit of another circuit unit, and receive a start signal as the control signal in parallel from the control circuit via the start signal line,
   when the register circuit of the first circuit unit receives the start signal, the register circuit of the first circuit unit supplies the corresponding output signal to an input terminal of another circuit unit, and the gate signal generation circuit of the first circuit unit does not output a gate signal to any of the plurality of gate signal lines, and
   when the register circuit of the second circuit unit receives the start signal, the register circuit of the second circuit unit does not supply the corresponding output signal to an input terminal of another circuit unit, and the gate signal generation circuit of the second circuit unit outputs at least one gate signal to at least one gate signal line.

2. The display device according to claim 1, wherein
   the circuit units are disposed in the peripheral area so as to be aligned in a row along the display area,
   the first circuit unit is disposed at an end of a cascade of the circuit units, and
   the second circuit unit is disposed adjacent to the first circuit unit.

3. The display device according to claim 1, wherein
   the circuit units are disposed in the peripheral area so as to be aligned in a row along the display area,
   the second circuit unit is disposed at an end of a cascade of the circuit units, and
   the first circuit unit is disposed adjacent to the second circuit unit.

4. The display device according to claim 1, wherein each register circuit includes a second input terminal connected to an output terminal of a register circuit of another circuit unit, the gate signal line driving circuit further includes a third circuit unit and a fourth circuit unit as the circuit unit of the plurality of circuit units, both receiving the control signal from the control circuit, the second input terminal of the register circuit of the third circuit unit and the second input terminal of the register circuit of the fourth circuit unit are connected in parallel to the start signal line instead of an output terminal of a register circuit of another circuit unit, and receive a start signal as the control signal in parallel from the control circuit via the start signal line, when the register circuit of the third circuit unit receives the start signal, the register circuit of the third circuit unit supplies the corresponding output signal to an input terminal of another circuit unit, and the gate signal generation circuit of the third circuit unit does not output a gate signal to any of the plurality of gate signal lines, and when the register circuit of the fourth circuit unit receives the start signal, the register circuit of the fourth circuit unit does not supply the corresponding output signal to an input terminal of another circuit unit, and the gate signal generation circuit of the fourth circuit unit outputs at least one gate signal to at least one gate signal line.

5. The display device according to claim 4, wherein
the circuit units are disposed in the peripheral area so as to be aligned in a row along the display area,
the first circuit unit is disposed at an end of a cascade of the circuit units,
the second circuit unit is disposed adjacent to the first circuit unit,
the third circuit unit is disposed at another end of the cascade of the circuit units, and
the fourth circuit unit is disposed adjacent to the third circuit unit.

6. The display device according to claim 4, wherein
the circuit units are disposed in the peripheral area so as to be aligned in a row along the display area,
the second circuit unit is disposed at an end of a cascade of the circuit units,
the first circuit unit is disposed adjacent to the second circuit unit,
the fourth circuit unit is disposed at another end of the cascade of the circuit units, and
the third circuit unit is disposed adjacent to the fourth circuit unit.

7. The display device according to claim 4, wherein
the gate signal line driving circuit and the control circuit constitute a bidirectional shift register, and
the control circuit inputs the control signal to either the first circuit unit and the second circuit unit or the third circuit unit and the fourth circuit unit.

8. The display device according to claim 1, wherein
an edge of the display area includes a curved portion in a plan view, and
the first circuit unit and the second circuit unit are disposed so as to be aligned along the curved portion.

9. The display device according to claim 4, wherein
an edge of the display area includes a curved portion in a plan view, and
the third circuit unit and the fourth circuit unit are disposed so as to be aligned along the curved portion.

10. The display device according to claim 1, wherein the gate signal generation circuit generates a plurality of the gate signals, based on output signals from the register circuits, and outputs the plurality of gate signals to the plurality of the gate signal lines.

11. The display device according to claim 1, further comprising:
a clock line separately from the start signal line, the clock line transmitting a clock signal from the control circuit, wherein
the register circuit of the first circuit unit includes a first transistor connected to the clock line,
the register circuit of the second circuit unit includes a second transistor connected to the clock line, and
the first transistor and the second transistor have different channel types mutually.

12. The display device according to claim 1, wherein the gate signal generation circuit of the first circuit unit has no line that transmits the gate signal to another circuit.

* * * * *